US007441126B2

(12) United States Patent
Dellmo et al.

(10) Patent No.: US 7,441,126 B2
(45) Date of Patent: Oct. 21, 2008

(54) SECURE WIRELESS LAN DEVICE INCLUDING TAMPER RESISTANT FEATURE AND ASSOCIATED METHOD

(76) Inventors: Russell Dellmo, 1209 Lamplight Dr., Palm Bay, FL (US) 32907; James Bergman, 2298 Woodlawn Cir., Melbourne, FL (US) 32934; David W. Hall, 525 Harwood Ave., Satellite Beach, FL (US) 32937

( * ) Notice: Subject to any disclaimer, the term of this patent is extended or adjusted under 35 U.S.C. 154(b) by 1813 days.

(21) Appl. No.: 09/761,173

(22) Filed: Jan. 16, 2001

(65) Prior Publication Data
US 2002/0095594 A1    Jul. 18, 2002

(51) Int. Cl.
*G06F 21/00* (2006.01)
(52) U.S. Cl. ............... 713/194; 713/182; 713/189; 713/193; 380/247; 370/338
(58) Field of Classification Search .............. 380/28, 380/44, 247, 255, 30; 713/200, 201, 158, 713/161, 171, 194, 182, 189, 193; 370/338
See application file for complete search history.

(56) References Cited

U.S. PATENT DOCUMENTS

| 6,259,933 | B1* | 7/2001 | Bambridge et al. | 455/557 |
|---|---|---|---|---|
| 6,480,477 | B1* | 11/2002 | Treadaway et al. | 370/314 |
| 6,560,448 | B1* | 5/2003 | Baldwin et al. | 455/234.1 |
| 6,665,285 | B1* | 12/2003 | Treadaway et al. | 370/338 |
| 2001/0021926 | A1* | 9/2001 | Schneck et al. | 705/54 |
| 2002/0114288 | A1* | 8/2002 | Soliman | 370/310 |

OTHER PUBLICATIONS

Harris Product Sheet, "SIERRA Cryptographic Module" Feb. 2000.
Website http://grouper.iee.org/groups/802/11/main.html, Document: IEEE P802.11-96/49C (Mar. 1996) pp. 1-4 and 1-22.
Website: http://www.symbol.com/products/wireless/wireless_sp24_2mb_broch.html "Symbol's Spectrum24® 2 Mbps Wireless LAN: Enabling Mobile Voice and Data Communications in Demanding Enterprise Environments", Apr. 2000.

(Continued)

*Primary Examiner*—Kambiz Zand
*Assistant Examiner*—Tongoc Tran
(74) *Attorney, Agent, or Firm*—Allen Dyer Doppelt Milbrath & Gilchrist

(57) ABSTRACT

A secure wireless LAN device includes a housing, a wireless transceiver carried by the housing, and a cryptography circuit carried by the housing. The cryptography circuit may operate using cryptography information and may also render unuseable the cryptography information based upon tampering. The cryptography circuit may include at least one volatile memory for storing the cryptography information, and a battery for maintaining the cryptography information in the at least one volatile memory. Accordingly, the cryptography circuit may further include at least one switch operatively connected to the housing for disconnecting the battery from the at least one volatile memory so that the cryptography information therein is lost based upon breach of the housing. The cryptographic information may comprise a cryptography key and/or at least a portion of a cryptography algorithm. This cryptographic information remains relatively secure and is lost upon tampering, such as removing the housing.

12 Claims, 10 Drawing Sheets

OTHER PUBLICATIONS

Data Sheet, "3Com® AirConnect® 11 Mbps Wireless LAN Solution" May 2000, pp. 1-6.
Intersil Data Sheet, HFA3983, File No. 4634.6 "2.4GHz Power Amplifier and Detector", pp. 4/1-4/7 Mar. 2000.
Intersil Data Sheet, HFA3683A, File No. 4634.6 "2.4 GHz RF/IF Converter and Synthesizer", pp. 2/1-2/23 Sep. 2000.
Intersil Data Sheet, HFA3783, File No. 4633.3 "I/Q Modulator/Demodulator and Synthesizer", pp. 7-36 Nov. 2000.
Intersil Data Sheet, HFA3841, File No. 4661.2 "Wireless LAN Medium Access Controller", pp. 1-27 Jan. 2000.
Intersil Data Sheet, HFA3861B, File No. 4816 "Direct Sequence Spread Spectrum Baseband Processor", pp. 1-37 Jan. 2000.

* cited by examiner

SECURE WIRELESS LAN DEVICE INCLUDING TAMPER RESISTANT FEATURE AND ASSOCIATED METHOD

FIELD OF THE INVENTION

The present invention relates to the field of communications and computers, and, more particularly, to a secure wireless local area network (LAN) and associated methods.

BACKGROUND OF THE INVENTION

Computers are often connected together as part of a Local Area Network (LAN). The LAN permits computers to share data and programs with one another. Many typical LANs are based upon physical connections between individual computers and a server, for example. The connections may be twisted pair conductors, coaxial cables, or optical fibers, for example.

There is also another class of LAN based upon wireless communication to the individual computers. A wireless LAN is not restricted to having physical connections to the individual computers. Accordingly, original installation may be simplified. Additionally, one or more of the computers may be used in a mobile fashion. In other words, the user may use a laptop computer and move from place to place while still being connected via the wireless LAN.

In particular, the IEEE standard 802.11 is directed to a wireless LAN. The IEEE 802.11 standard defines the protocol for several types of networks including ad-hoc and client/server networks. An ad-hoc network is a simple network where communications are established between multiple stations in a given coverage area without the use of an access point or server. The standard provides methods for arbitrating requests to use the medium to ensure that throughput is maximized for all of the users in the base service set.

The client/server network uses an access point that controls the allocation of transmit time for all stations and allows mobile stations to roam from one access point to another. The access point is used to handle traffic from the mobile radio to the wired or wireless backbone of the client/server network. This arrangement allows for point coordination of all of the stations in the basic service area and ensures proper handling of the data traffic. The access point routes data between the stations and other wired/wireless stations or to and from the network server.

Of course, two or more LANs may be interconnected using wireless LAN devices at respective access points. This may be considered a network bridge application.

Security is addressed in the 802.11 standard as an option and may be accomplished by an encryption technique known as the Wired Equivalent Privacy (WEP) algorithm. This algorithm is based on protecting the transmitted data over the radio transmission using a 64-bit seed key and the RC4 encryption algorithm. WEP, however, only protects the data packet information and does not protect the physical layer header. This is so that other stations on the network can listen to the control data needed to manage the network. Unfortunately, this may provide a reduced level of security.

To provide higher levels of security, more powerful cryptographic equipment is available, such as a TACLANE KG-175. This equipment provides confidentiality and end-to-end authentication to protect sensitive information. Unfortunately, for a wireless LAN, such a device is relatively bulky and expensive.

Also, the WEP algorithm and the key may be readily determined upon obtaining possession of a LAN device and downloading the security associated memory contents, for example. Once the key is determined, the communications is no longer secure.

SUMMARY OF THE INVENTION

In view of the foregoing background, it is therefore an object of the invention to provide a secure wireless LAN device that provides greater security, and yet without a significant increase in cost and/or complexity.

This and other objects, in accordance with the invention are provided by a secure wireless LAN device which in one embodiment includes a housing, a wireless transceiver carried by the housing, and a cryptography circuit carried by the housing. More particularly, the cryptography circuit may operate using cryptography information and may also render unusable the cryptography information based upon tampering. Accordingly, one obtaining possession of the device cannot readily determine the cryptography information needed to intercept communications. Of course, the secure wireless LAN device may be used with other LAN devices, such as user stations and/or access points, in any of a number of different LAN configurations.

The cryptography circuit may comprise at least one volatile memory for storing the cryptography information, and a battery for maintaining the cryptography information in the at least one volatile memory. Accordingly, the cryptography circuit may further include at least one switch operatively connected to the housing for disconnecting the battery from the at least one volatile memory so that the cryptography information therein is lost based upon breach of the housing. The switch may be provided by one or more switch clips and associated circuitry.

The cryptographic information may comprise a cryptography key and/or at least a portion of a cryptography algorithm. This cryptographic information remains relatively secure and is lost upon tampering, such as removing the housing.

The secure wireless LAN device may also include a media access controller (MAC), and the MAC may implement a predetermined wireless LAN MAC protocol. For example, the predetermined wireless LAN MAC protocol may be based upon the IEEE 802.11 standard.

The secure wireless LAN device may also comprise at least one connector carried by the housing for connecting to at least one of a user station and an access point. For example, the at least one connector may be a PCMCIA connector.

The cryptography circuit may comprise a cryptography processor, and a control and gateway circuit connecting the cryptography processor to the MAC and the wireless transceiver. The wireless transceiver may comprise a baseband processor, a modem connected to the baseband processor, and a radio frequency transmitter and receiver connected to the modem. In addition, the secure wireless LAN device may also include at least one antenna carried by the housing and connected to the wireless transceiver.

A method aspect of the invention is for making tamper resistant a secure wireless LAN device comprising a housing, a wireless transceiver carried by the housing and a cryptography circuit carried by the housing. The method may include storing cryptography information in the cryptography circuit, and rendering unusable the cryptography information based upon tampering with the secure wireless LAN device. The cryptography circuit may comprise at least one volatile memory for storing the cryptography information, and a battery for maintaining the cryptography information in the at least one volatile memory. In this embodiment, rendering unusable comprises disconnecting the battery from the at least one volatile memory based upon a breach of the housing.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-6, the secure wireless LAN device 20 and its use in various LAN configurations are first described. The device 20 is illustratively in the form of a PC-card, such as an extended Type 2 PC-card. The device 20 includes a housing 21 which carries a connector 27 at one end, and a pair of antennas 22 at the opposite end.

For example, the housing 21 may have a length of about 5.75 inches, which is slightly longer than typical PC-cards. This extended length may serve to accommodate additional cryptography circuitry as will be described in greater detail below. The housing 21 may also have a width of about 2.1 inches, and thickness of about 0.2 inches. Of course, other dimensions are also contemplated by the invention.

Figure 2:
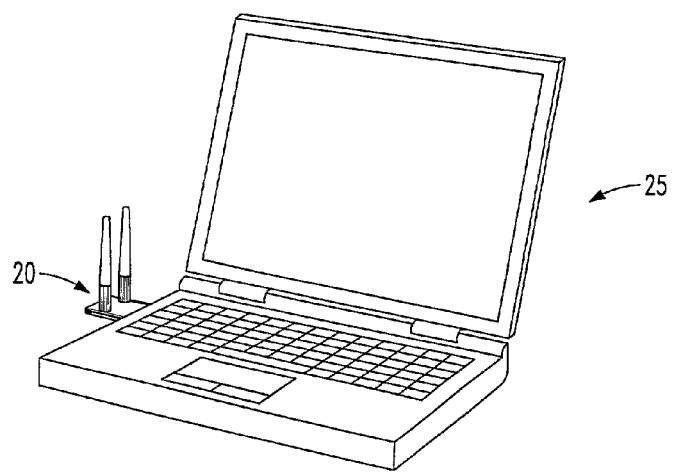
FIG. 2 is a perspective view of a laptop computer including the secure wireless LAN device as shown in FIG. 1.
Figure 3:
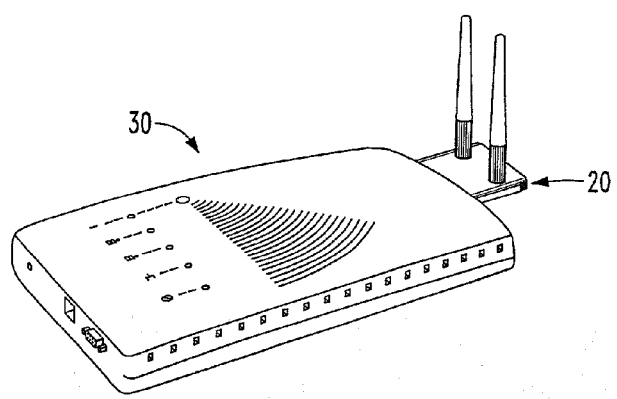
FIG. 3 is a perspective view of a LAN access point device including the secure wireless LAN device as shown in FIG. 1.

The interface connector 27 may be a PCMCIA connector or other similar connector that can readily interface to a number of possible LAN devices as will be appreciated by those skilled in the art. For example, as shown in FIG. 2, the secure wireless LAN device 20 may be received in a corresponding PC-card slot in the side of a laptop computer 25. The device 20 may also be received in a PC-card slot of an access point 30 as shown in FIG. 3.

Figure 4:
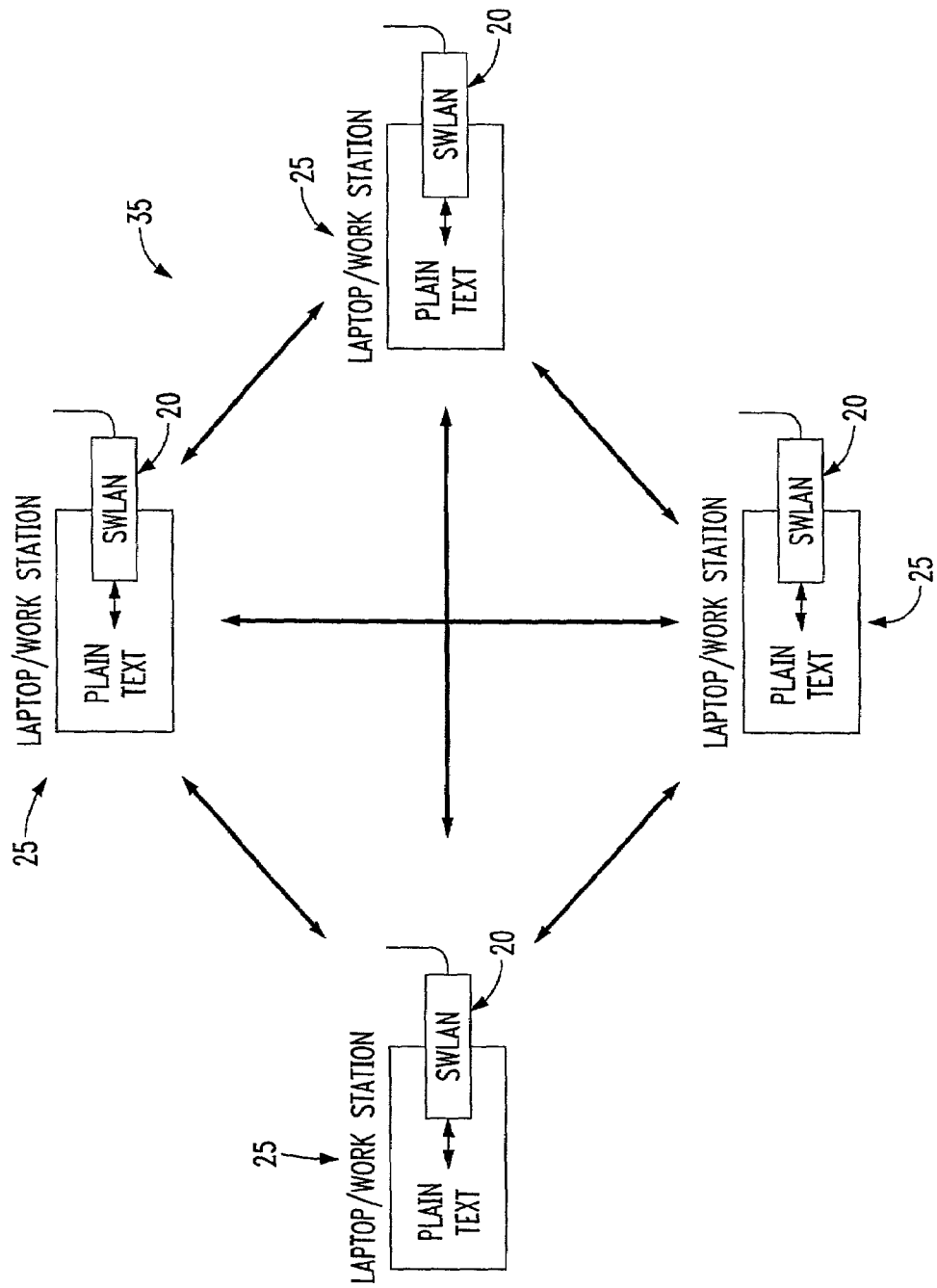
FIG. 4 is a schematic diagram of an ad-hoc LAN using the secure wireless LAN devices as shown in FIG. 1.

As shown in FIG. 4, a plurality of user stations 25 may be connected in an ad-hoc LAN configuration 35 where each station can communicate with every other station using the secure wireless LAN devices 20. Unencrypted data called "plain text" is generated at the station 25 and encrypted data called "cipher text" is sent over the radio frequency (RF) links between the secure wireless LAN devices 20.

Figure 5:
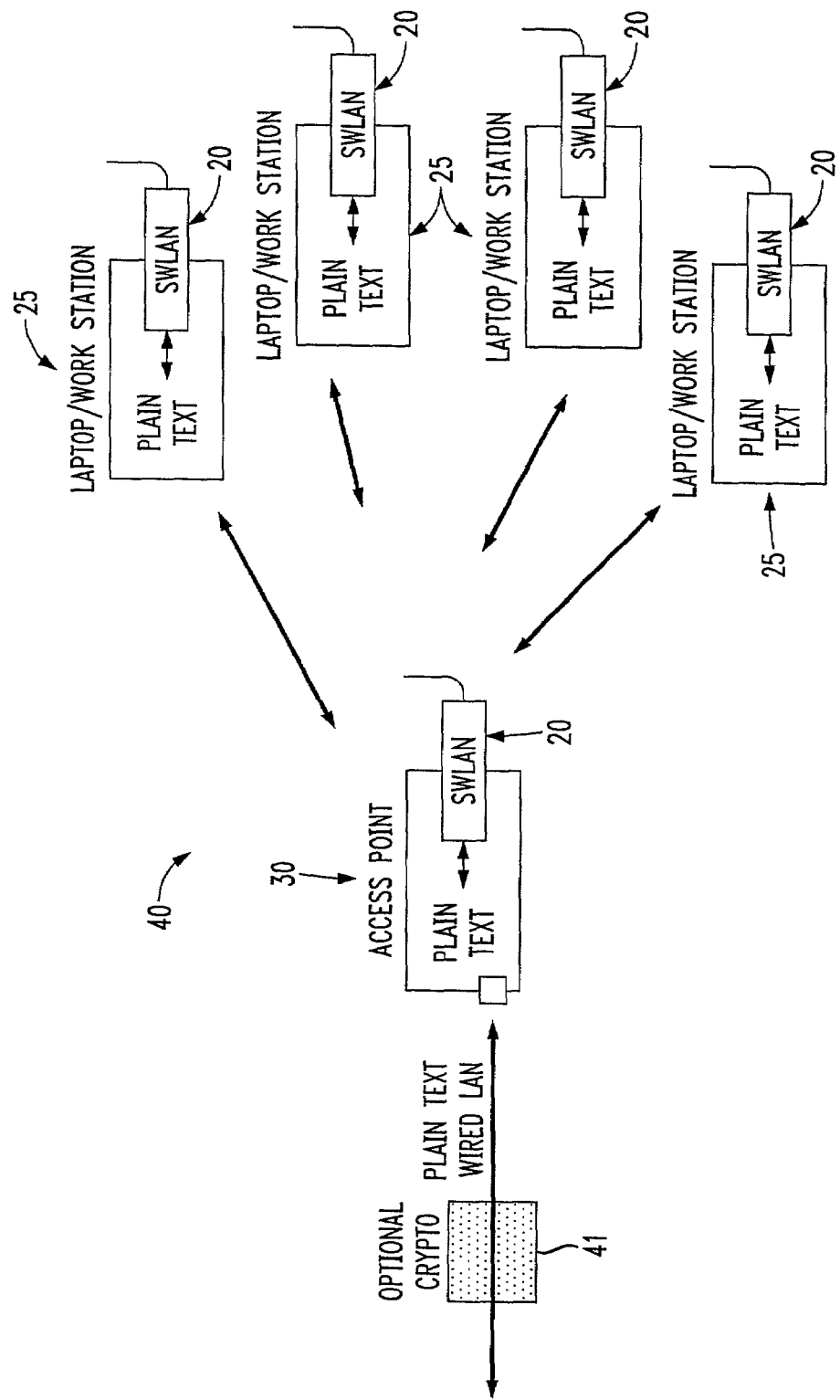
FIG. 5 is a schematic diagram of an infrastructure LAN using the secure wireless LAN devices as shown in FIG. 1.

An infrastructure LAN configuration 40 is shown in FIG. 5. In this LAN configuration 40, each user station 25 communicates with the access point 30 via respective secure wireless LAN devices 20. In addition, in the illustrated LAN configuration 40, the access point 30 is also connected to a conventional wired LAN. Cryptography may be optionally applied to the communications over the wired LAN using a conventional cryptography device 41 as will be appreciated by those skilled in the art.

Figure 6:
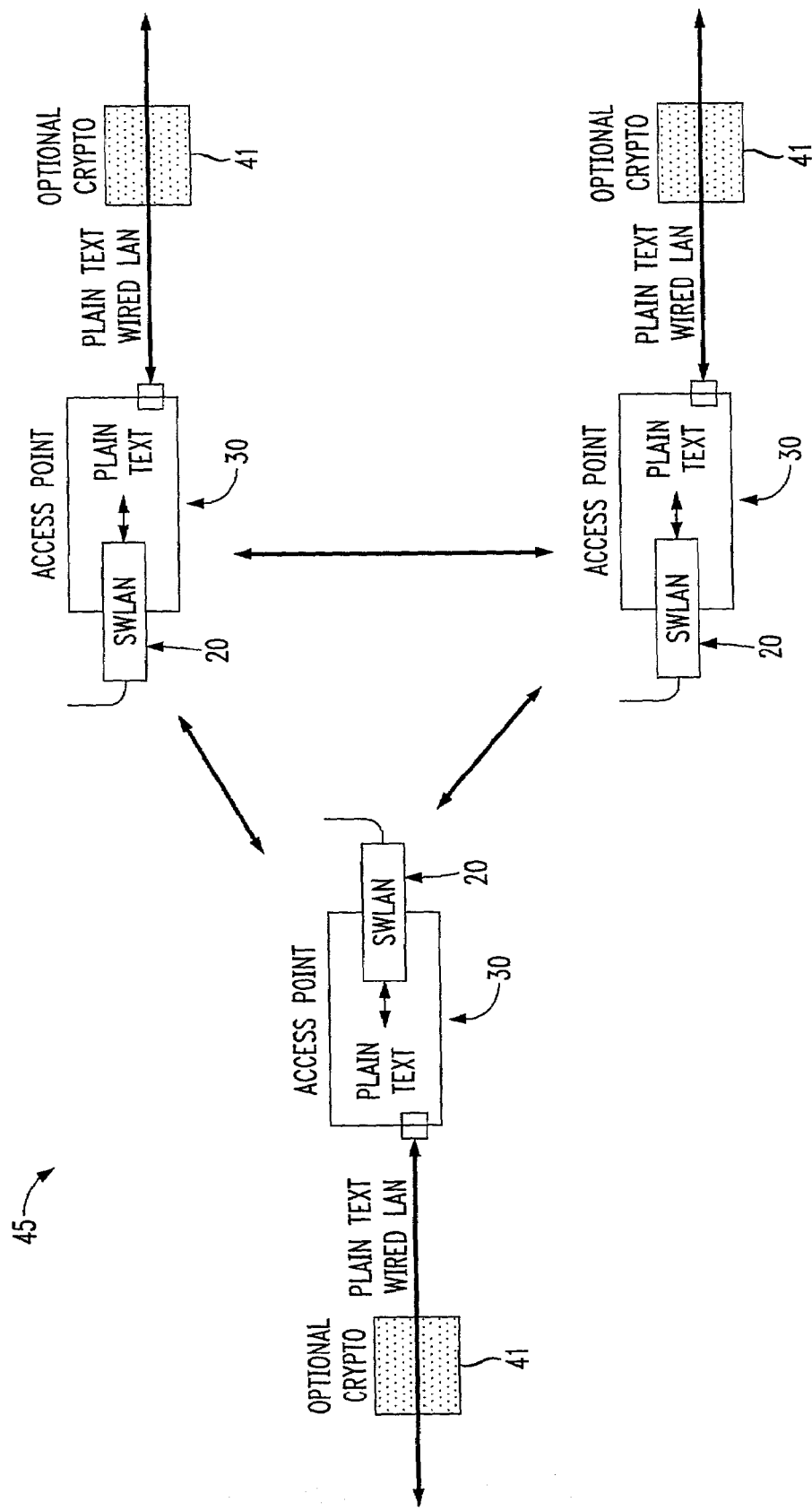
FIG. 6 is a schematic diagram of a network bridge LAN configuration using the secure wireless LAN devices as shown in FIG. 1.

A network bridge LAN system 45 is illustrated in FIG. 6. This configuration or system 45 provides for communications between access points 30 of different LANs. The secure wireless LAN devices 20 are used to provide the secure RF links between the access points 30. Cryptography devices 41 may be optionally used on the wired connections to the access points as shown in the illustrated LAN system 45.

Figure 1:
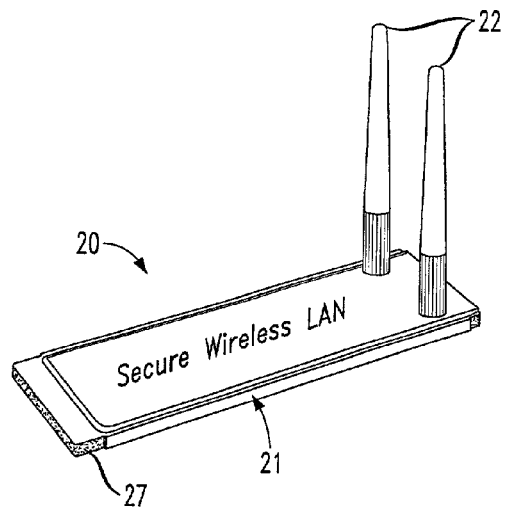
FIG. 1 is a perspective view of the secure wireless LAN device in accordance with the invention.
Figure 7:
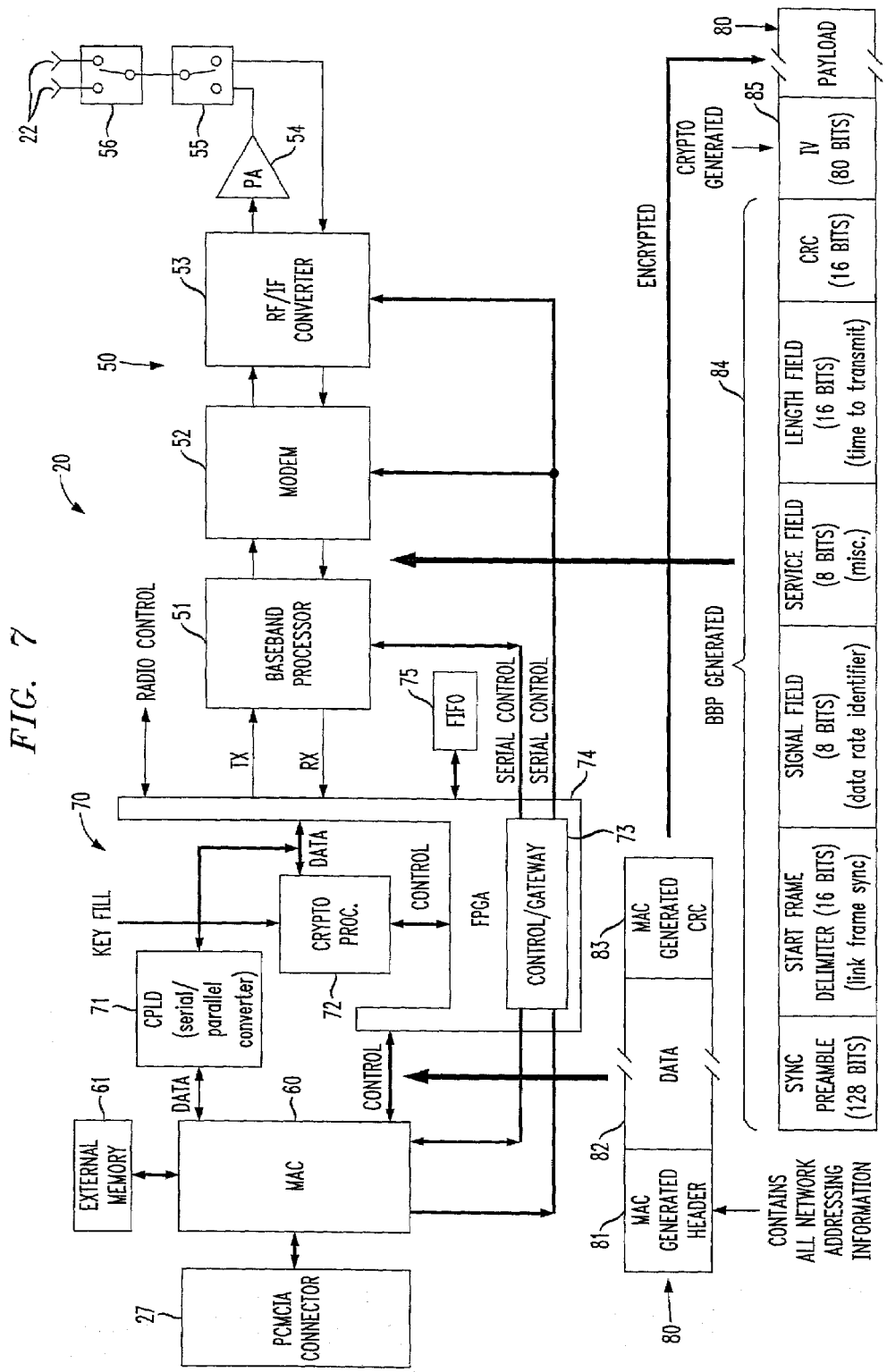
FIG. 7 is a schematic block diagram of the secure wireless LAN device as shown in FIG. 1.
Figure 8:
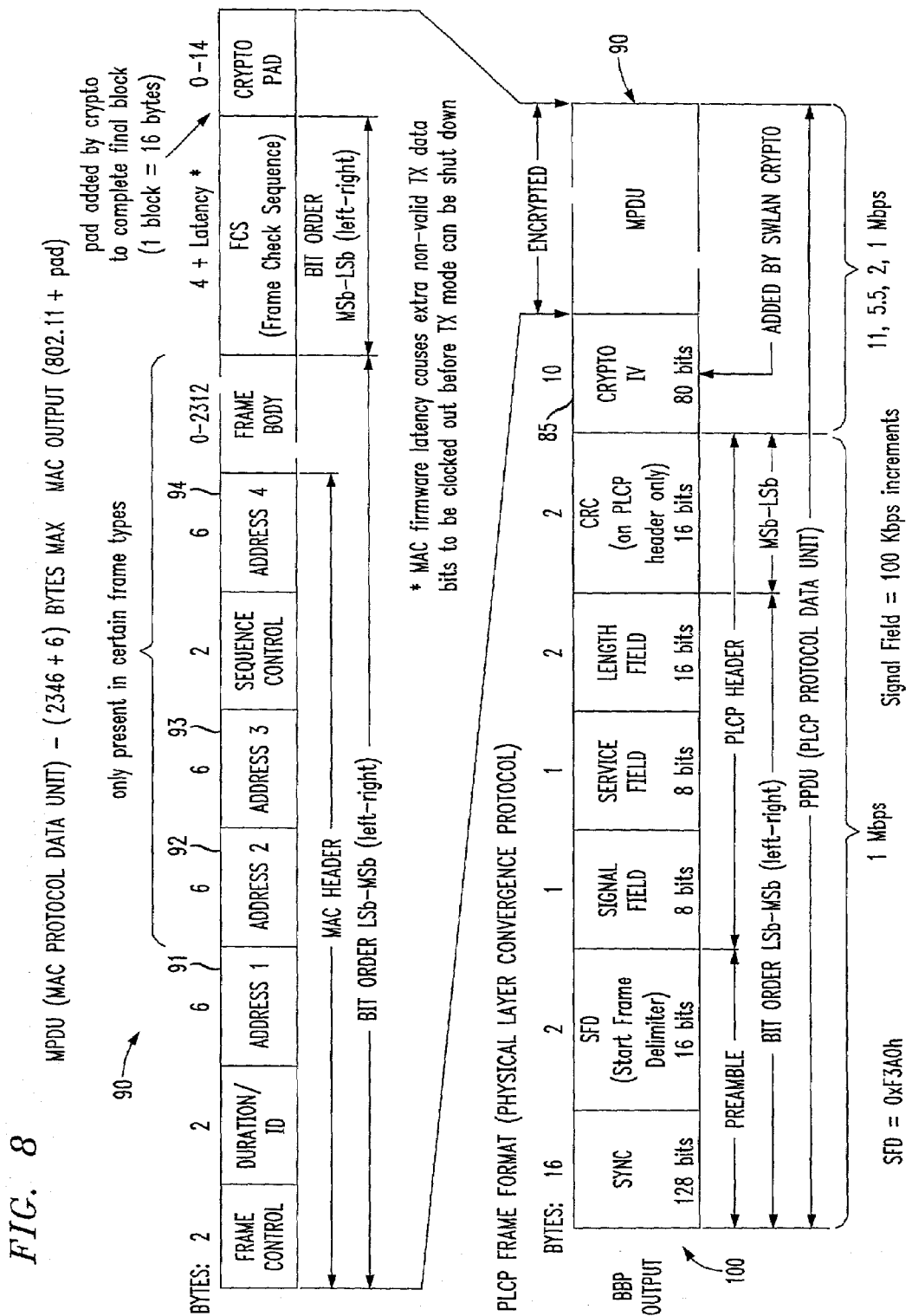
FIG. 8 is a chart of the data unit protocol for the secure wireless LAN device as shown in FIG. 1.

Turning now to FIGS. 7 and 8 the secure wireless LAN device 20 is now described in greater detail. The device 20 includes a wireless transceiver 50, a medium access controller (MAC) 60 and its associated memory 61, and a cryptography circuit 70. Each of these circuit portions are carried by or contained within the housing 21 (FIG. 1).

In accordance with one aspect of the invention, the cryptography circuit 70 may encrypt both address and data information for transmission, and decrypt both address and data information upon reception. A higher level of security is thus provided. The cryptography circuit 70 may implement a cryptographic algorithm and use a cryptographic key to provide a predetermined security level. For example, the cryptography circuit 70 may use an algorithm and key to provide Type 1 security. Lower levels of security, such as DES and triple DES, may also be implemented as will be readily appreciated by those skilled in the art.

The MAC 60 may implement a predetermined wireless LAN MAC protocol. In one preferred embodiment, the LAN MAC protocol may be based upon the IEEE 802.11 standard. The MAC 60 may be a model HFA3841 MAC chip available from INTERSIL of Melbourne, Fla. Other similar MACs may also be used. The model HFA3841 is a chip from among a chipset offered by INTERSIL as part of its PRISM® 2.4 Ghz WLAN chip set. Further details of the HFA3841 are available in the data sheet for this part dated January 2000, file number 4661.2, the entire disclosure of which is incorporated herein by reference.

The wireless transceiver 50 may include a baseband processor 51, a modem 52 connected to the baseband processor, and a radio frequency transmitter and receiver connected to the modem. The RF transmitter and receiver are provided in the illustrated embodiment by the RF/IF converter 53, the power amplifier 54 connected to the transmit output, and the pair of switches 55, 56 connected to the antennas 22.

The baseband processor 51 may be a model HFA3863 Direct Sequence Spread Spectrum Baseband Processor also available from INTERSIL. The baseband processor 51 provides the functions needed for a full or half-duplex packet baseband transceiver. Further details of the HFA3863 are available in the data sheet for this part dated May 2000, file number 4856.1, the entire disclosure of which is incorporated herein by reference.

The modem 52 may be a model HFA3783 part also offered by INTERSIL which is a fully differential SiGe baseband converter for half-duplex wireless applications. It features the necessary circuitry for quadrature modulation and demodulation of "I" and "Q" baseband signals and includes the required synthesizer as will be appreciated by those skilled in the art. Further details of the HFA3783 are available in the data sheet for this part dated November 2000, file number 4633.3, the entire disclosure of which is incorporated herein by reference.

The RF/IF converter and synthesizer 53 may be provided by an INTERSIL part number HFA3683A. This part is a SiGe half-duplex RF/IF transceiver for operation at the 2.4 Ghz ISM band. The HFA3683A is further described in the data sheet for this part dated September 2000, file number 4634.6, the entire disclosure of which is incorporated herein by reference.

The power amplifier 54 may be a model MA02303GJ available from M/A-COM. The power amplifier circuit 54 may also include an external detector so that an accurate automatic level control can be implemented. The MA02303GJ is further described in the data sheet for this part, the entire disclosure of which is incorporated herein by reference.

In addition to the INTERSIL and M/A-COM components described herein, other similar components may also be used from other manufacturers. Representative other products/manufacturers include the AirConnect® product of 3COM, and the Spectrum24® product from SYMBOL, for example.

The cryptography circuit 70 also includes a cryptography processor 72 and serial-to-parallel converter (CPLD) 71 connected to the MAC 60 and the cryptography processor. A control and gateway block 73 is provided as part of the field programmable gate array (FPGA) 74. A FIFO 75 is also illustratively connected to the FPGA 74.

As seen in the lower portion of FIG. 7, the MAC 60 generates a payload 80 including a header 81, the data 82, and a CRC code 83. This payload 80 is combined with the cryptography generated bits 85 and the baseband processor generated bits 84 in the illustrated embodiment.

Referring now additionally to FIG. 8, exemplary data structures are further described. The upper portion of FIG. 8 sets forth the MAC protocol data unit 90. Of interest, addresses 1-4 may be provided as indicated with reference numerals 91-94. The lower portion of FIG. 8 illustrates the baseband output in greater detail, showing the physical layer convergence protocol (PLCP) frame format 100. These various data structures or formats are exemplary only and will be appreciated by those of skill in the art without further discussion. Of course, other formats may also be used as will also be appreciated by those skilled in the art.

As will be appreciated by those skilled in the art, the cryptography processor 72 may add a plurality of encrypting bits 85 to be transmitted over an extended time, for example, as compared to the IEEE 802.11 standard. Accordingly, the control and gateway circuit 73 may control the transmitter to operate for this extended time. For example, the transmitter may be readied earlier and operate slightly longer than would otherwise be the case without the cryptography features of the present invention. Other schemes for handling the slightly longer data packets are also contemplated by the present invention.

Figure 9:
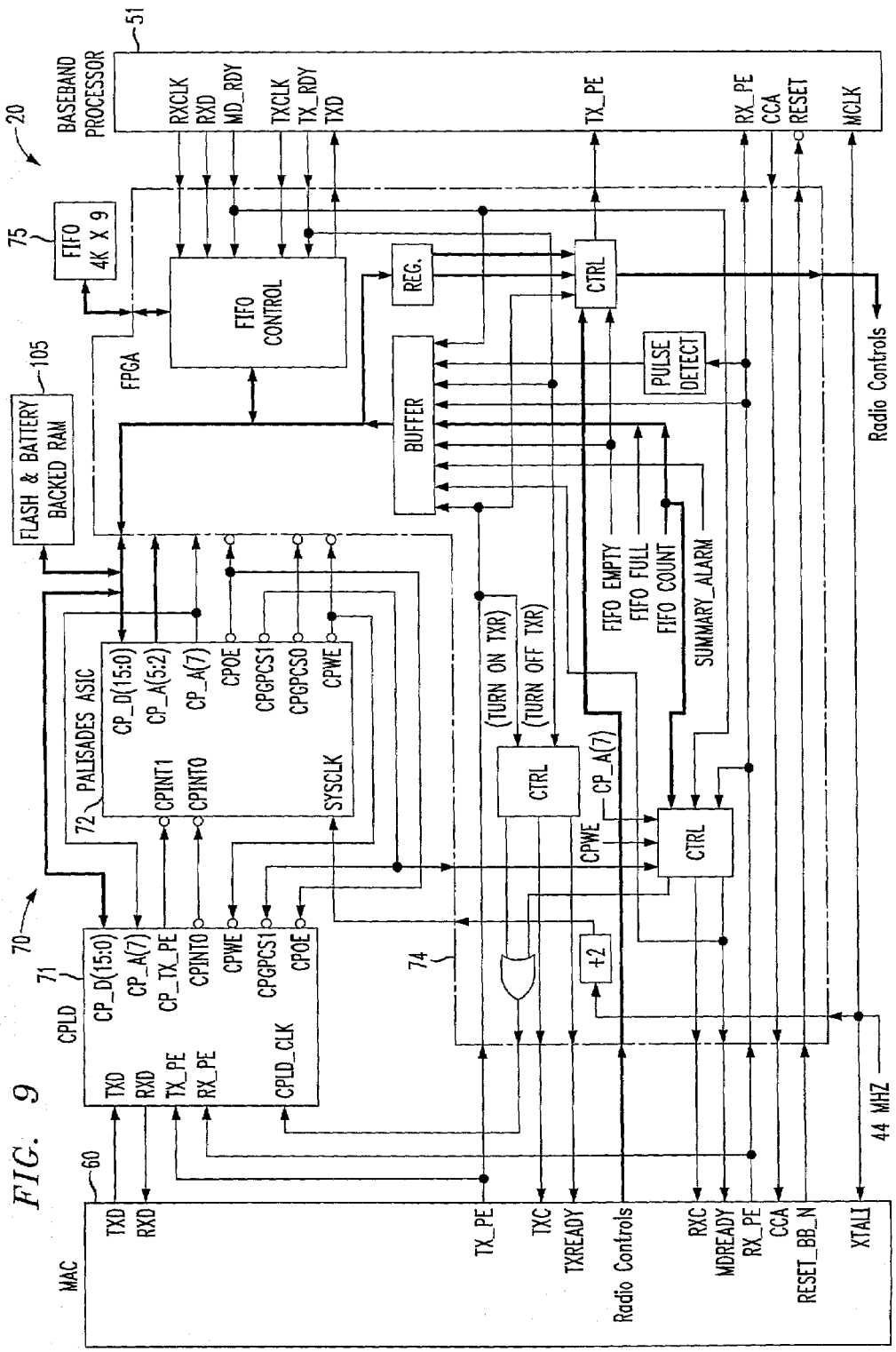
FIG. 9 is a more detailed schematic block diagram of the secure wireless LAN device as shown in FIG. 1 and illustrating the cryptographic traffic path.

Referring now additionally to FIG. 9, additional portions of the secure wireless LAN device 20 are now described. The cryptography circuit 70 may be provided, for example, by a SIERRA™ cryptographic module available from Harris Corporation of Melbourne, Fla. which is also the assignee of the present invention. The cryptography processor 72 may be a Palisades ASIC, for example, as in the SIERRA™ cryptographic module. The cryptography circuit 70 also includes a RAM and associated back-up battery 105 as will be discussed in greater detail below. The FPGA 74 may be programmed to produce the various devices and logic blocks as shown in FIG. 9 as will be appreciated by those skilled in the art.

Figure 10:
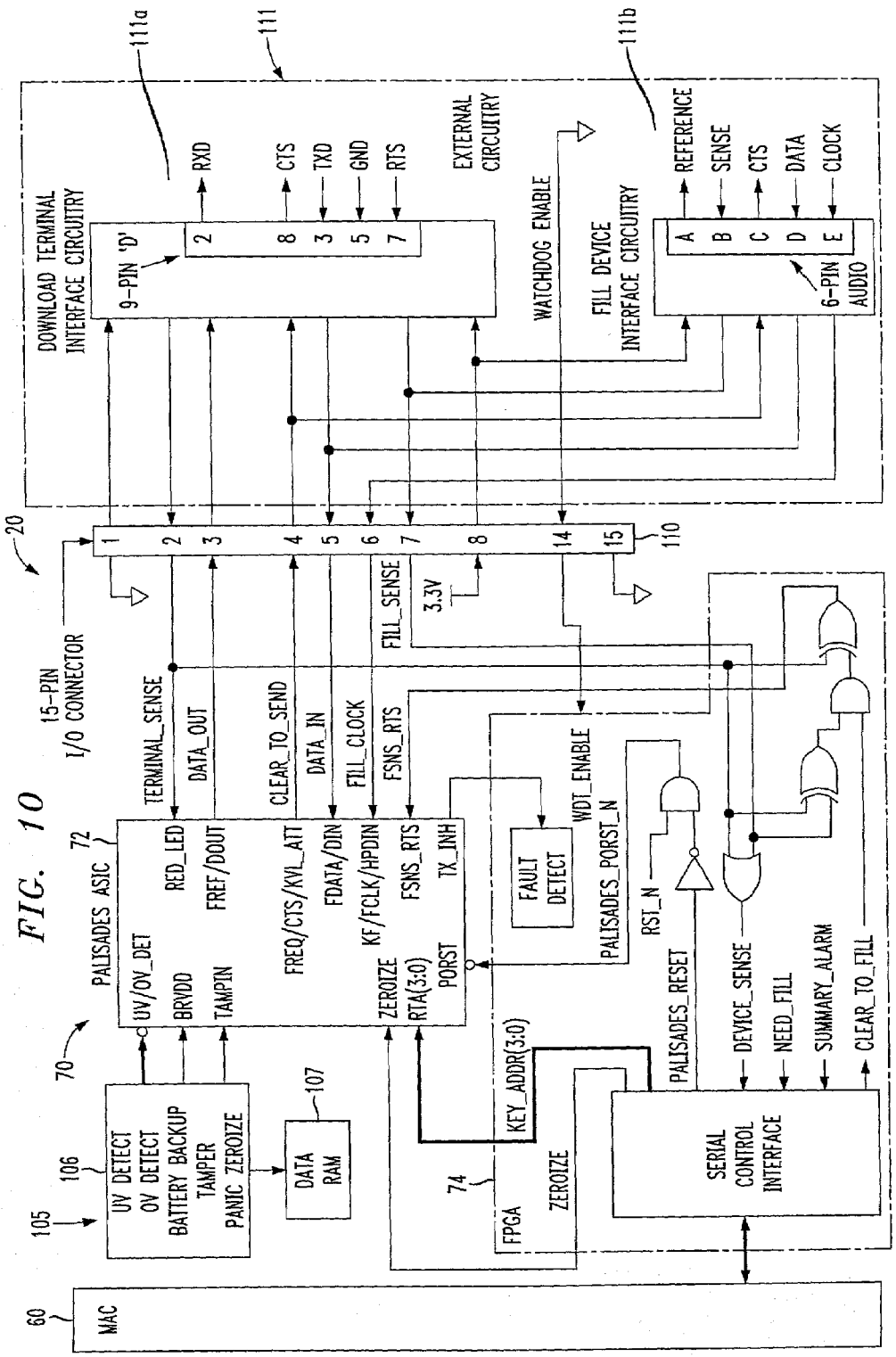
FIG. 10 is a more detailed schematic block diagram of the secure wireless LAN device as shown in FIG. 1 and illustrating the key fill and algorithm download connectors.

As explained with additional reference to FIG. 10, the secure wireless LAN device 20 may include a fifteen-pin connector 110 carried by the housing and used to interface to external circuitry 111 as will be appreciated by those skilled in the art. The external circuitry 111 may include download terminal interface circuitry 111*a* to permit the cryptographic algorithm, or at least portions thereof, to be loaded. In addition, the external circuitry 111 may include fill device interface circuitry 111*b* to provide the key fill to the cryptography processor 72. In other embodiments, different interfaces may be used for these features as will be appreciated by those skilled in the art.

The illustrated embodiment also includes an undervoltage, overvoltage, tamper, and zeroize circuit block 106 connected to the cryptography processor 72 and to the RAM 107. The secure wireless LAN device 20 may have its key changed periodically as required, and may also have the cryptography algorithm updated or changed as well to provide further flexibility and security.

Figure 11:
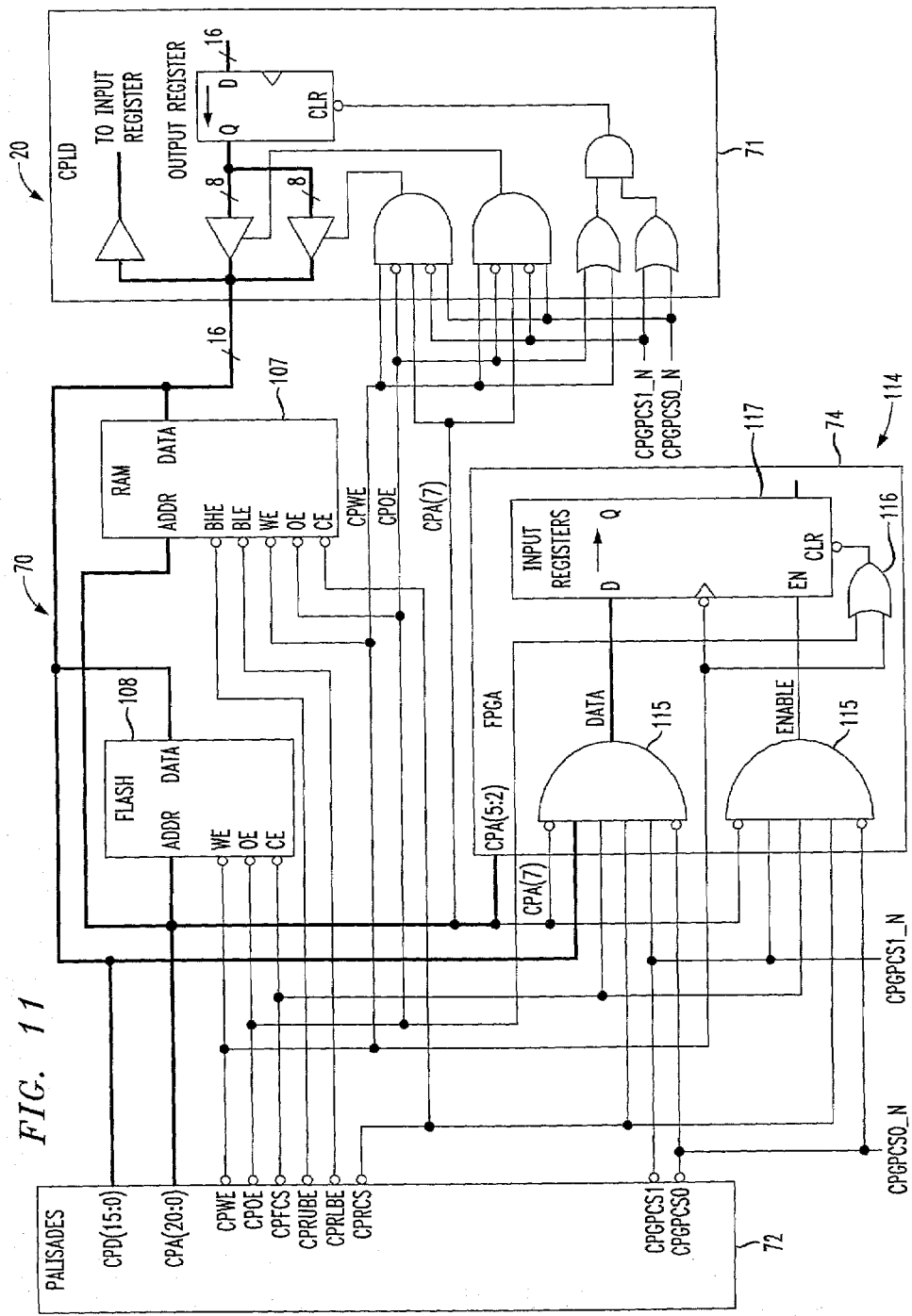
FIG. 11 is a more detailed schematic block diagram of the secure wireless LAN device as shown in FIG. 1 and illustrating the data bus protection.

Turning now to FIG. 11, the cryptography circuit 70 may also comprise a protection circuit 114 to protect against transmission of unencrypted data. The protection circuit 114 may be provided by logic gates 115, 116 and input registers 117 implemented within the FPGA 74 as will be appreciated by those skilled in the art. This protection circuit 114, along with similar protection circuitry within the CPLD 71, provides redundancy so that plain text is not accidentally transmitted from the secure wireless LAN device 20. Also shown in the illustrated embodiment are FLASH 108 and RAM 107 to be used by the cryptography processor 72.

One method aspect of the invention is for providing a secure wireless LAN system, such as the LAN configurations or systems 35, 40 and 45 shown respectively in FIGS. 4-6, for example. The method may include equipping a plurality of LAN devices with respective secure wireless LAN devices 20 as described herein. In particular, the method may further include providing a cryptography circuit 70 carried by the housing and cooperating with the MAC 60 and the wireless transceiver 50 for encrypting both address and data information for transmission, and for decrypting both address and data information upon reception.

Figure 12:
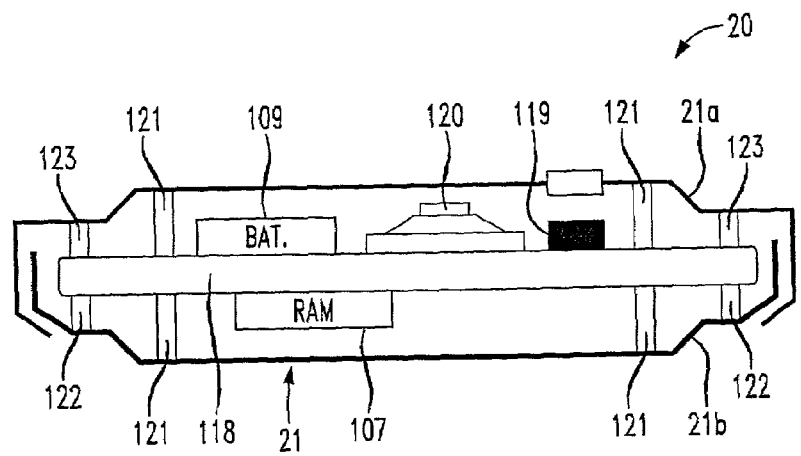
FIG. 12 is a schematic transverse cross-sectional view of the secure wireless LAN device as shown in FIG. 1.
Figure 13:
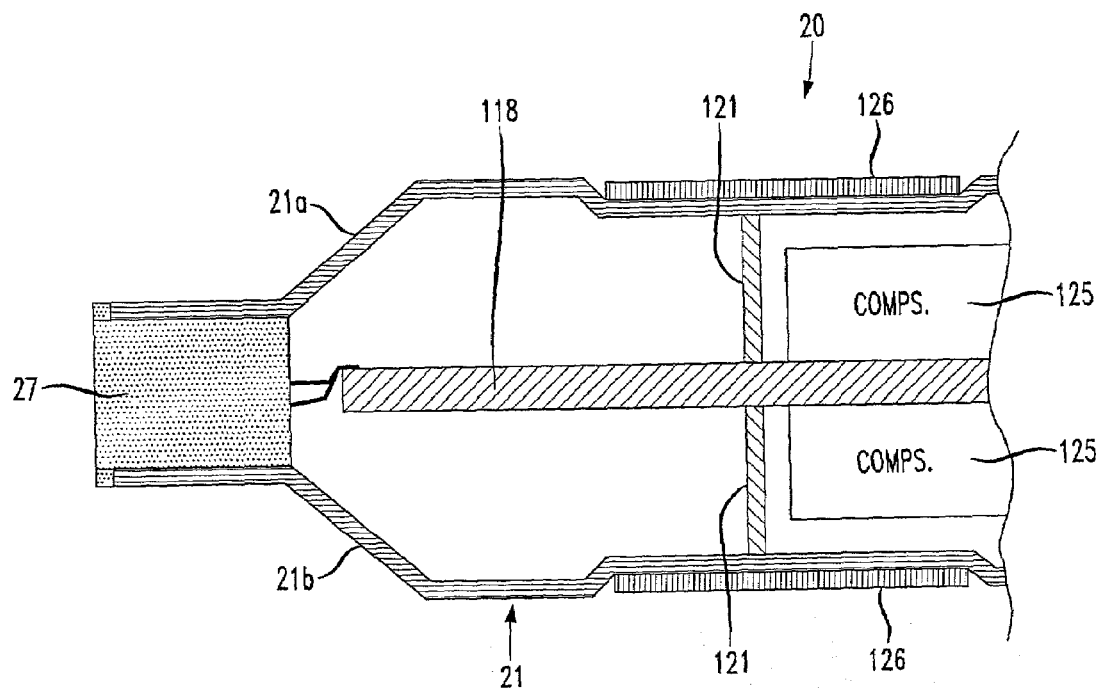
FIG. 13 is a schematic longitudinal cross-sectional view of a portion of the secure wireless LAN device as shown in FIG. 1.

Yet other important features of the secure wireless LAN device 20 are now described with additional reference to FIGS. 12 and 13. The device 20 illustratively includes a two-part housing 21 provided by a metal top and bottom 21*a*, 21*b* which clip or engage together along opposing longitudinal side edges. The housing 21, in turn, carries a printed wiring board 118. The printed wiring board 118 may carry the MAC, cryptography circuit, and wireless transceiver as discussed extensively above. In addition, other circuitry and devices may also be provided in the housing 21 as schematically indicated in FIG. 13 as components 125. These components 125 may be carried by both sides of the printed wiring board 118, and the printed wiring board maybe a multilayer wiring board as will be appreciated by those skilled in the art. Labels 126 may be carried in respective recesses formed in the housing 21 as shown in FIG. 13.

The printed wiring board 118 also illustratively carries an indicator LED 119 and a zeroize switch or circuit 120 as shown in FIG. 12. Ground clips 122 tie the housing bottom 21b to an electrical ground on the printed wiring board 118. In addition, tamper switch clips 123 engage the upper housing portion or top 21a in the illustrated embodiment. The volatile memory or RAM 107 and back-up battery 109 are also schematically illustrated as being carried by the printed wiring board 118.

The secure wireless LAN device 20 includes the cryptography circuit 70 described herein that operates using cryptography information. In accordance with this aspect of the invention, the cryptography circuit also renders unusable the cryptography information based upon tampering. In other terms, the cryptography circuit 70 may comprise at least one volatile memory 107 for storing the cryptography information, and a battery 109 for maintaining the cryptography information in the at least one volatile memory. Accordingly, the cryptography circuit may further include at least one switch, such as the illustrated tamper clips 123 operatively connected to the housing 21, and to associated circuitry, for disconnecting the battery 109 from the at least one volatile memory 107 so that the cryptography information therein is lost based upon breach of the housing.

As will be appreciated by those skilled in the art, the cryptographic information may comprise a cryptography key and/or at least a portion of a cryptography algorithm as discussed in detail above. This cryptographic information remains relatively secure and is lost upon tampering, such as removing or breaching the housing 21.

Another method aspect of the invention is for making tamper resistant a secure wireless LAN device 20 comprising a housing 21, a wireless transceiver 50 carried by the housing and a cryptography circuit 70 carried by the housing. The method may include storing cryptography information in the cryptography circuit 70, and rendering unusable the cryptography information based upon tampering with the secure wireless LAN device. The cryptography circuit 70 may comprise at least one volatile memory 107 for storing the cryptography information, and a battery 109 for maintaining the cryptography information in the at least one volatile memory. In this embodiment, rendering unusable comprises disconnecting the battery from the at least one volatile memory based upon a breach of the housing. Of course, other schemes for rendering the cryptography information unusable are also contemplated by the present invention.

Other aspects of the secure wireless LAN device 20 are described in copending patent application entitled "SECURE WIRELESS LAN DEVICE AND ASSOCIATED METHODS", Ser. No. 09/760,619, which is also assigned to the present assignee. The entire disclosure of this application is incorporated herein by reference. In addition, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A secure wireless local area network (LAN) device comprising:
    a housing;
    a wireless transceiver carried by said housing;
    a media access controller (MAC) carried by said housing; and
    a cryptography circuit carried by said housing and connected to said MAC and said wireless transceiver, said cryptography circuit comprising
        at least one volatile memory for storing the cryptography information, and
        a battery for maintaining the cryptography information in said at least one volatile memory.

2. A secure wireless LAN device according to claim 1 wherein said cryptography circuit further comprises at least one switch operatively connected to said housing for disconnecting said battery from said at least one volatile memory so that the cryptography information therein is lost based upon a breach of said housing.

3. A secure wireless LAN device according to claim 1 wherein said cryptographic information comprises a cryptography key.

4. A secure wireless LAN device according to claim 1 wherein said security information comprises at least a portion of a cryptography algorithm.

5. A secure wireless LAN device according to claim 1 wherein said MAC implements a predetermined wireless LAN MAC protocol.

6. A secure wireless LAN device according to claim 5 wherein said predetermined wireless LAN MAC protocol is based upon the IEEE 802.11 standard.

7. A secure wireless local area network (LAN) device comprising:
    a housing;
    a wireless transceiver carried by said housing;
    at least one connector carried by said housing for connecting to at least one of a LAN station and a LAN access point; and
    a cryptography circuit carried by said housing and connected to said wireless transceiver, said cryptography circuit comprising
        at least one volatile memory for storing the cryptography information, and
        a battery for maintaining the cryptography information in said at least one volatile memory.

8. A secure wireless LAN device according to claim 7 wherein said cryptography circuit further comprises at least one switch operatively connected to said housing for disconnecting said battery from said at least one volatile memory so that the cryptography information therein is lost based upon breach of said housing.

9. A secure wireless LAN device according to claim 7 wherein said cryptographic information comprises a cryptography key.

10. A secure wireless LAN device according to claim 7 wherein said security information comprises at least a portion of a cryptography algorithm.

11. A secure wireless LAN device according to claim 7 further comprising a media access controller (MAC) carried by said housing; and wherein said MAC implements a predetermined wireless LAN MAC protocol.

12. A secure wireless LAN device according to claim 11 wherein said predetermined wireless LAN MAC protocol is based upon the IEEE 802.11 standard.

* * * * *